US006850815B1

(12) United States Patent
Veenstra

(10) Patent No.: US 6,850,815 B1
(45) Date of Patent: Feb. 1, 2005

(54) PROGRAMMED LOADING OF DISPENSER WITH SUPPLY OF DISPENSABLE OBJECTS

(75) Inventor: John H. Veenstra, Pittsford, NY (US)

(73) Assignee: PJ Solutions, Inc., Fairport, NY (US)

( * ) Notice: Subject to any disclaimer, the term of this patent is extended or adjusted under 35 U.S.C. 154(b) by 38 days.

(21) Appl. No.: 10/729,394

(22) Filed: Dec. 5, 2003

(51) Int. Cl.[7] .............................................. G06F 17/00

(52) U.S. Cl. ......................... 700/231; 700/242; 221/12; 221/19; 221/123; 221/124; 221/125; 221/129; 221/197

(58) Field of Search ................................ 700/231, 237, 700/242; 221/2, 20, 12, 19, 92, 123, 124, 125, 129, 197

(56) References Cited

U.S. PATENT DOCUMENTS

| | | | | |
|---|---|---|---|---|
| 5,463,514 A | | 10/1995 | Yaeger | 360/105 |
| 5,573,413 A | | 11/1996 | David et al. | 439/159 |
| 5,629,662 A | | 5/1997 | Floyd et al. | 337/36 |
| 5,990,777 A | | 11/1999 | Whiteman, Jr. | 337/140 |
| 6,017,231 A | | 1/2000 | Yoshitsugu et al. | 439/159 |
| 6,338,007 B1 | | 1/2002 | Broadfield et al. | 700/231 |
| 6,704,615 B1 | * | 3/2004 | Veenstra et al. | 700/231 |
| 6,738,690 B2 | * | 5/2004 | Veenstra | 700/236 |

* cited by examiner

*Primary Examiner*—Khoi H. Tran
(74) *Attorney, Agent, or Firm*—Brown & Michaels, PC

(57) ABSTRACT

Dispensable objects are loaded into a portable case for transport to a dispensing site by connecting a reload controller with a case to be reloaded. Latchable and unlatchable object retainers arrayed in the case are relatched, and the reload controller is activated to respond to a reloading request to unlatch some of the retainers in locations suitable for receiving reloaded objects. A person then reloads the chosen objects in the array locations opened up by the unlatched retainers and relatches those retainers. The controller then acts upon another reloading request to unlatch more retainers in locations suitable for receiving additionally loaded objects, as the loading sequence repeats.

23 Claims, 3 Drawing Sheets

Object reloading flowchart

Figure 1:
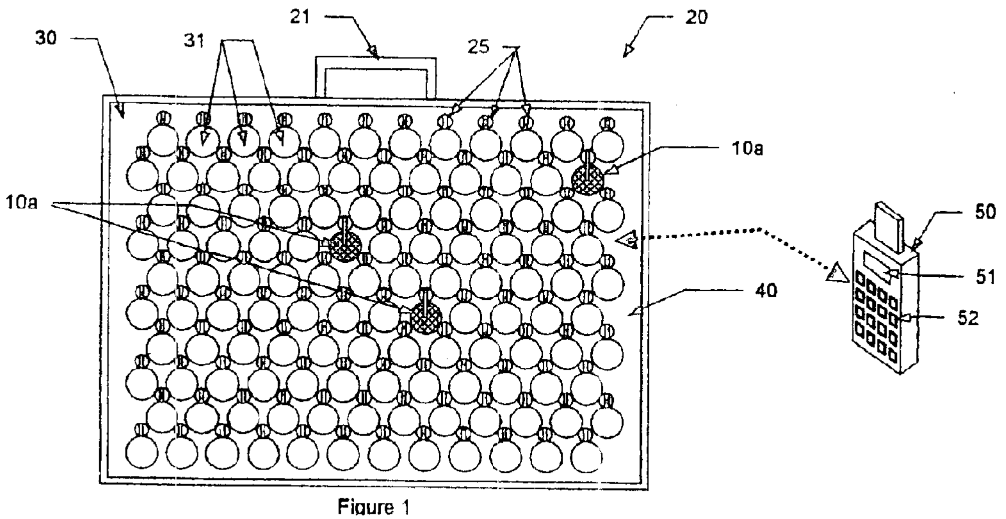

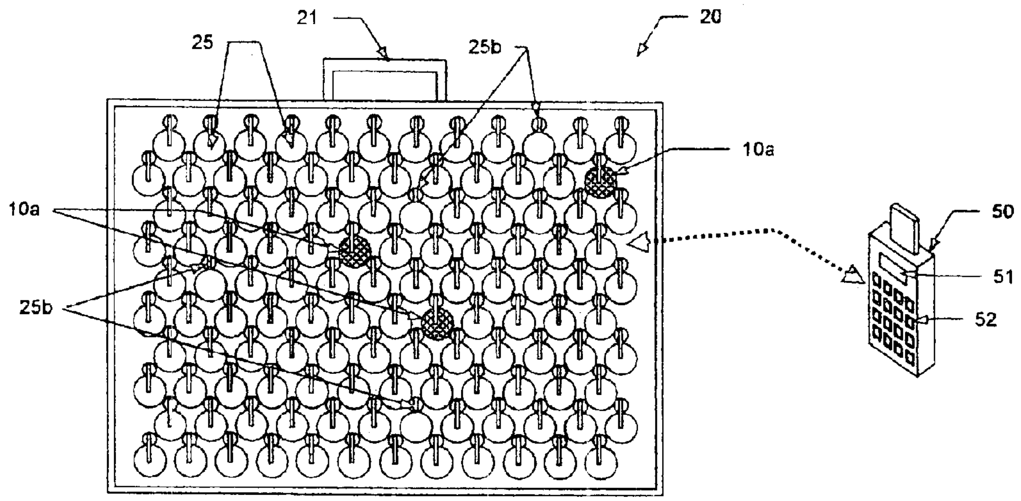
Fiaure 3
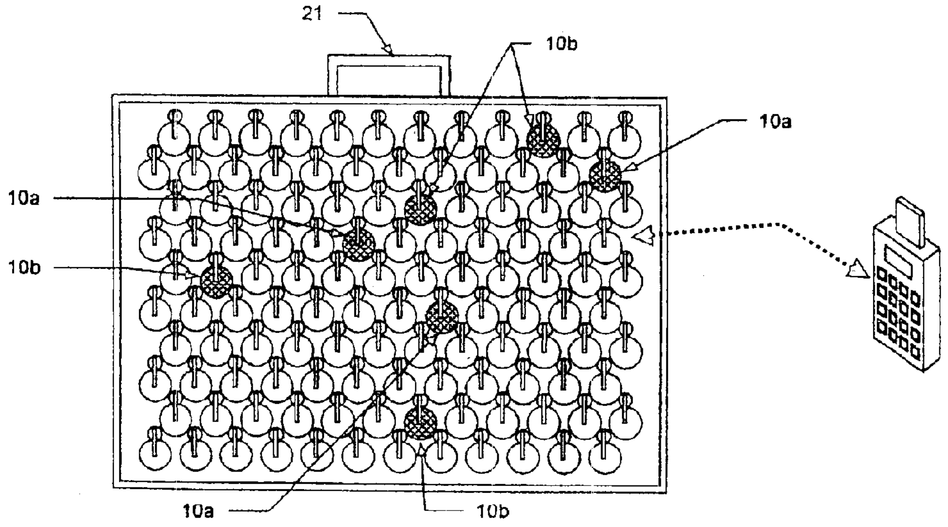
Fiqure 4

Object reloading flowchart

PROGRAMMED LOADING OF DISPENSER WITH SUPPLY OF DISPENSABLE OBJECTS

TECHNICAL FIELD

Mechanically loading objects for dispensing so as to retain information about the loaded objects.

BACKGROUND

Loading of various objects accurately into a dispensable array so as to retain loading information presents problems that have not been satisfactorily solved by the many dispensers that have been proposed. Generally, these suffer from expense, size, and weight; the need for complex electromechanical devices; the need to adapt to information storing and transmitting technologies; and limitations on the variety of objects that can be dispensed.

Some dispensing devices have required loading of objects into columns so that all the objects in a single column are the same and the objects are dispensed from the bottoms of the columns. This limits the variety of objects available to the number of columns and precludes dispensing objects from any location within a matrix array.

Other solutions have used carousels or juke box type mechanisms, which are electromechanically complex and expensive. Drawer and locker dispensers have also been proposed, and some of these use machine readable information to identify loaded objects so that dispensing equipment can locate and dispense the identified objects.

All these suggestions are limited in the object packing density and variety they can achieve, are generally cumbersome and expensive, and create and manage object-loading information only at considerable additional expense. Such systems are also vulnerable to human error in loading objects incorrectly to create mismatches with the loading information. The result has left many businesses with unfulfilled needs for the dispensing of small objects in an efficient and low cost way.

SUMMARY OF THE INVENTION

This invention proposes a dispensable object loading and information generating system applied to a variety of objects dispensed from an array. The invention seeks to reduce loading errors and to generate and preserve accurate information on the objects loaded in the array. Such information is valuable for the object loading operation and is also needed for the object dispensing.

The invention applies to a dispenser holding an array of dispensable objects with latchable and unlatchable retainers. Unlatching mechanisms for the retainers are actuated via microcircuitry in the dispenser that receives and retains loading information. A reload controller connects to the microcircuitry during the loading process and is able to unlatch the latch mechanisms via the microcircuitry.

The reload controller is programmed to determine the number of each of a variety of objects to be loaded into an array for dispensing. The reload controller uses its microcircuitry connection to the retainer latches to direct a human performing the reloading while producing loading information usable later in the dispensing operation.

The reload controller has an interface accessible to a person desiring to reload the dispenser. The reload controller can prompt the person with programmed suggestions for objects to be loaded, and the person can input to the reload controller intentions to load specific objects.

The person first latches any unlatched retainers in the dispensing array and then instructs the reload controller or complies with a prompt from the reload controller to load a predetermined number of one of the variety of objects to be dispensed. The reload controller then unlatches retainers for positions available in the array for loading the selected objects. The unlatched retainers allow access to locations within the array where the objects can be loaded, and they also provide visual clues to a person doing the reloading of where the objects are to be placed. The person loads those objects into the unlatched locations, with very little chance of error, and latches the retainers to hold the loaded objects in place. The person then acknowledges to the reload controller the completion of the loading of the selected objects and moves on to the next selected objects. The acknowledgment actuates the reload controller to communicate to the microcircuitry in the dispenser the locations, identity, and number of the loaded objects. When the loading procedure is completed, the dispensing array is loaded as fully as desired; and the microcircuitry in the dispenser is informed of all the locations and types of objects loaded. Any of these can then be dispensed from any location within the array.

Commonly assigned U.S. application Ser. No. 10/215,239, filed on Aug. 8, 2002, and U.S. application Ser. No. 10/254,296, filed on Sep. 25, 2002, both of which are incorporated by reference herein, combine with the invention of this application to form an improved system.

DRAWINGS

Figure 2:
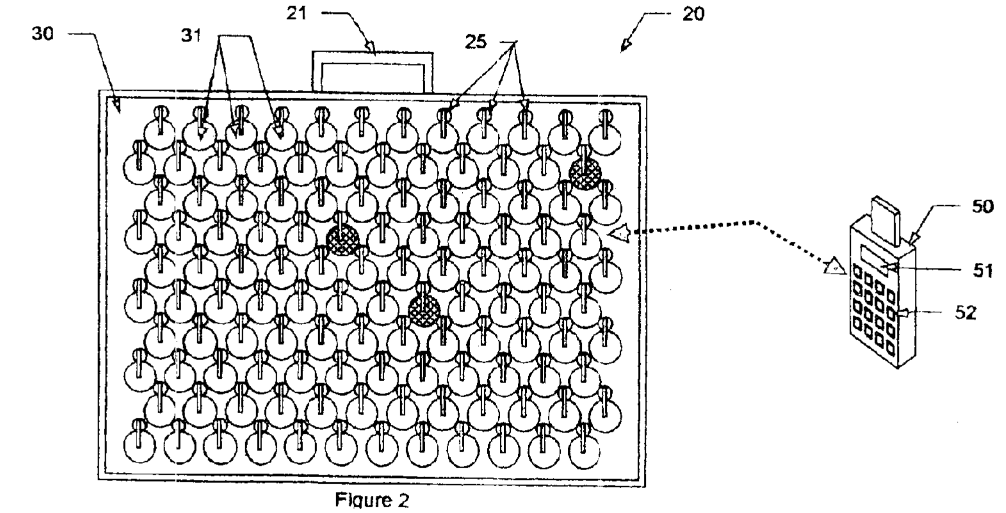

FIGS. 1–4 are partially schematic views of a dispenser connected to a reload controller at various stages of a dispenser reloading process showing: a mostly empty dispenser ready for reloading in FIG. 1; the dispenser of FIG. 1 with relatched retainers in FIG. 2; the dispenser of FIG. 2 with unlatched retainers giving a visual indication and access to reloadable spaces in FIG. 3; and the dispenser of FIG. 3 reloaded with objects-held by relatched retainers in FIG. 4.

Figure 5:
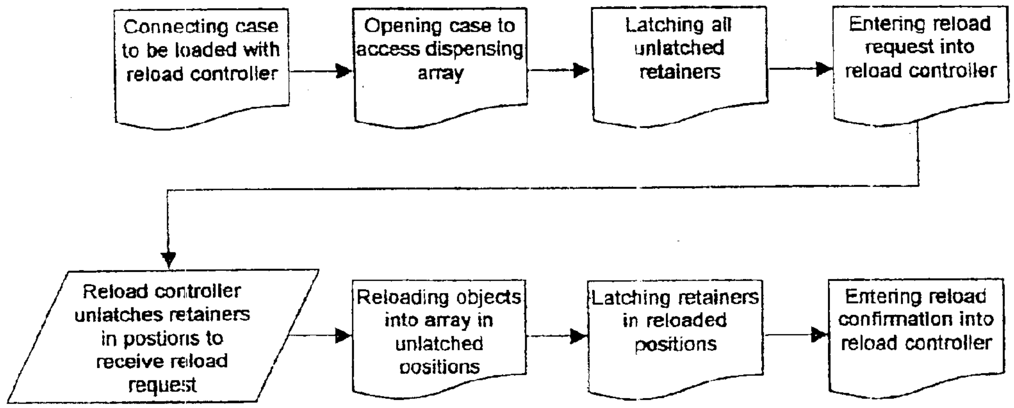

FIG. 5 is a schematic flow diagram of the preferred steps involved in reloading the dispenser of FIGS. 1–4.

DETAILED DESCRIPTION

Reloading and dispensing according to the invention is accomplished via portable cases 20 having carrying handles 21 and made light enough to carry back and forth between a loading site and a dispensing site. This has several advantages including ensuring that reloading is done in a controlled environment in an efficient way, compared with the usual need for a serviceman to visit a dispensing site to reload a dispensing machine. The incorporated information from U.S. application Ser. No. 10/215,239, filed on Aug. 8, 2002, entitled "Information Management Of Supply Flow Of Dispensed Objects", provides a specific implementation of the preferred portable dispenser system.

Portable case 20 also includes microcircuitry 40 containing a memory record of what has been loaded and dispensed, and this memory travels with case 20 so that the information is available at both the dispensing and loading sites. The microcircuitry 40 can be arranged in any convenient spot within case 20, and is schematically shown in the drawings as lying in a plane behind an array 30 of object holding locations 31 and corresponding-latchable and unlatchable object retainers 25. The incorporated information from U.S. application Ser. No. 10/254,296, filed on Sep. 25, 2002, entitled "Object Dispenser", provides a specific implementation of such retainers.

Microcircuitry 40 communicates electrically with retainers 25 and can be activated to unlatch any retainer 25. In an unlatched position as shown for all but three of the retainers in FIG. 1, retainers 25 allow objects 10 to enter into locations 31 or exit from locations 31. Retainers 25 are manually latchable to the latched position shown for all the retainers 25 in FIG. 2, where they block objects from going into or out of array locations 31.

Reload controller 50 is preferably a microcontroller deployed at a reloading site by being electrically connected to portable case 20 to communicate with microcircuitry 40, as shown by the double-headed broken lines in FIGS. 1–4. In a connected condition, reload controller 50 can receive information from case 20 on undispensed objects, and on the dispensing of objects from a previous load. Reload controller 50 can thereby establish what, if anything, remains within case 20 and where any remaining objects are located in case 20.

Controller 50 is also involved in the reloading of case 20 and is preferably programmed to determine a desired loading of objects into case 20 for return to a dispensing site. Past experience on what objects have been needed at the dispensing site can be used in programming controller 50 so that a reloaded container 20 will contain the objects that are desired in the numbers that are expected to be needed at the dispensing site.

Reload controller 50 preferably includes a display 51, a keypad 52, and a usable connection (not shown) to a computer. Display 51 and keypad 52 offer an interface with a person reloading case 20 so that display 51 can convey information, and keypad 52 can receive information. Many variations are possible in the configuration and programming of a suitable reload controller 50.

The case 20 that is illustrated, for example, in FIG. 1 is nearly empty and contains only three objects 10*a*, which are indicated by hatched lines at three of the array locations 31. The three objects 10*a* are all that remain from a case full of objects that were dispensed before the case returned to the loading site. Connecting controller 50 to case 20 delivers information to controller 50 on the identity of the undispensed or remaining objects 10*a* and the location of these objects within case 20. The reloading process, for purposes of illustration then assumes that the three objects 10*a* remaining in case 20 are suitable for return to the dispensing site with a fresh load of additional objects. Alternatively, the three undispensed objects 10*a* could be removed from case 20 and replaced with other reloaded objects for return to a dispensing site.

A person wishing to reload case 20 then manually latches retainers 25 so that they all block array locations 31, as illustrated in FIG. 2. Having all the retainers 25 in closed and latched positions is then visually apparent to the reloading person, and any retainer that is missed and left unlatched becomes conspicuous so that it can be latched, and container 20 can have the uniform appearance shown in FIG. 2.

By preprogramming of reload controller 50, preferably based on information about previous needs at a dispensing site, or by interaction with a person loading case 20, reload controller 50 preferably prompts the reloading person via display 51 to reload certain numbers of certain objects 10*b* into array 30. The person doing the reloading then acts upon the prompt or upon an input to controller 50 acknowledging the prompt and undertaking to reload the proposed objects into case 20. By having its prompt acknowledged, controller 50 responds by unlatching the required number of retainers 25 at suitable locations in array 30 to receive objects 10*b* for reloading. As illustrated in FIG. 3, four retainers are unlatched for this purpose and the unlatched retainers are each identified as 25*b*. The person then loads objects 10*b* into the array spaces 31 that are made available by unlatching of retainers 25*b* and relatches those retainers to hold objects 10*b* in place, as illustrated in FIG. 4.

Since retainers 25 are readily visible to the person reloading case 20, and since the difference between a latched and unlatched retainer 25 is visually apparent, the person doing the reloading is in effect instructed by controller 50 on where to put each type of object to be loaded. Since only one type of object is loaded at a time, the unlatching of retainers 25*b* to indicate where each type of object should be loaded helps eliminate errors in loading. The reload controller 50, by indicating array locations 31 that are available for objects then directs the person to put the objects in the correct locations where their whereabouts is known by controller 50.

After the person has loaded the desired number of one variety of objects 10*b* and has relatched retainers 25 so that reloaded objects are held in place in array 30, then the person doing the reloading acknowledges to controller 50 that the desired reloading step was achieved. Reload controller 50 then transmits to microcircuitry 40 the location and type of each of the reloaded objects 10*b*. This information remains in case 20 and travels with case 20 to a dispensing site.

The reloading process then proceeds in the sequence described above for the next type of object to be reloaded. Again, acting on a prompt from controller 50, or on input by the reloading person, controller 50 unlatches some additional retainers 25. These are visibly noticeable to the reloading person who then places the objects in the array locations 31 that are indicated by the unlatched retainers. The person then relatches retainers 25 and confirms to controller 50 that the selected objects have been loaded. The number of times the reloading sequence is repeated depends on the number of varieties of objects to be loaded, and continues until case 20 is fully loaded for return to a dispensing site. Information on the loading of the objects goes with the case to the dispensing site, and the interaction between controller 50, case 20, and a reloading person practically assures that the loading is all done accurately with no mismatch between the intended load and the actual load.

Reload controller 50 can also be programmed to distribute objects within array 30 with regard to their weight or mass. For example, reload controller 50 can be programmed to direct heavier objects to be loaded in lower regions of array 30 near a bottom of case 20 opposite carrying handle 21. This can help keep case 20 stable and avoid becoming top heavy. The loading of objects into case 20, as is apparent from the illustrations, can otherwise be practically random.

The flow chart of FIG. 5 illustrates the above-described steps in the object reloading process, beginning with connecting reload controller 50 with a case to be reloaded. For transport between a loading site and a dispensing site, each case 20 preferably has a cover or door enclosing the objects within, and although such a door is not illustrated, it can be provided with a lock limiting access to the case and adding to the security of the object flow. A person wishing to reload a case 20 necessarily removes or opens the cover or door to gain access to the object array 30.

All unlatched retainers mated with locations 31 from which objects have been dispensed are then relatched as previously explained. A reload request entered into controller 50 can be in response to a prompt by controller 50 that is acknowledged by the person doing the reloading, and in most situations this is preferred. The reloading person preferably also has the capacity to initiate reloading requests that are not preprogrammed into controller 50. Either way, controller 50 responds by unlatching retainers in locations 31 suitable for receiving objects 10*b* to be reloaded. The person then reloads objects 10*b* and relatches the retainers to hold the reloaded objects 10*b*. This returns case 20 to the state of having all its retainers 25 latched, and this prepares the way for a subsequent loading request to reload other objects into case 20. The sequence then repeats until case 20 is fully loaded and ready for return to a dispensing site. In this condition, information on all the objects loaded into case 20 and the location of those objects in case 20 is stored in microcircuitry 40 and travels with case 20 to the dispensing site.

I claim:

1. A system of loading dispensable objects into a dispenser in an array of locations, each location being arranged to receive one of a variety of the objects to be dispensed, the system comprising:

a. each of the array locations having a retainer that is moveable between a latched position retaining one of the objects and an unlatched position that can receive an object for retention and can release a retained object for dispensing;

b. the dispenser having microcircuitry operably communicating with each of the retainers and including a memory of objects loaded into the array locations;

c. a reload controller having an interface accessible to a person loading the dispenser;

d. the reload controller communicating with the microcircuitry in the dispenser;

e. the reload controller being programmed to direct loading of the dispenser with predetermined numbers of each of the varieties of the objects;

f. the reload controller being arranged to enable the microcircuitry to unlatch selected ones of the retainers in response to input from the person loading the objects so that the unlatched retainers provide access to array locations available for objects to be loaded and visual indications to the person of array locations in which objects to be loaded can be placed;

g. the unlatched retainers being manually latchable to retain the objects loaded into the array locations made accessible by the unlatched retainers; and h. the reload controller being arranged to receive confirmation from the person that the objects have been placed in the accessible and visually indicated array locations.

2. The system of claim 1 wherein the reload controller is programmed to unlatch the retainers in a random manner that distributes various weights of the objects randomly within the array.

3. The system of claim 1 wherein the reload controller in response to the confirmation from the person supplies the microcircuitry with information on the loading of the objects in the array locations.

4. The system of claim 1 wherein the dispenser is a portable case, and the microcircuitry carries the loading information from a loading site to a dispensing site.

5. The system of claim 1 wherein the microcircuitry supplies the reload controller with information on objects remaining in the array locations.

6. The system of claim 1 wherein the reload controller is arranged to display to the person information on objects loaded into the dispenser.

7. A method of operating the system of claim 1, the method comprising:

a. latching all unlatched retainers;

b. inputting to the reload controller a request to load a selected one of the variety of objects;

c. loading the selected variety of objects into the locations having retainers unlatched by the reload controller;

d. manually latching the retainers to retain the loaded objects; and e. confirming to the reload controller the loading of the selected variety of the objects.

8. A method of loading a dispenser with a supply of objects to be dispensed, the method comprising:

a. using a dispenser having an array receiving varieties of the objects to be dispensed and having a latchable and unlatchable object retainer arranged at each array location;

b. latching all unlatched object retainers within the dispenser to be loaded;

c. programming a reload controller to direct reloading of the dispenser with predetermined numbers of each of the varieties of the objects;

d. connecting the reload controller with microcircuitry in the dispenser so that the reload controller can enable the microcircuitry to selectively unlatch the retainers within the dispenser;

e. inputting into the reload controller a request to load a selected one of the varieties of the objects;

f. arranging the reload controller to respond to the load request by enabling the microcircuitry to unlatch selected ones of the retainers to afford access to available array locations and give a visual indication of locations available in the array for loading the selected variety of the objects;

g. placing the selected variety of the objects in the locations having unlatched retainers and latching the retainers after the objects are loaded; and h. entering a confirmation into the reload controller that the selected variety of the objects has been loaded into the spaces for which the retainers were unlatched.

9. The method of claim 8 including arranging the dispenser to communicate to the reload controller information on any objects remaining in the dispenser to be reloaded.

10. The method of claim 8 including arranging the reload controller to communicate to the microcircuitry information on the loading of the selected variety of objects into the dispenser.

11. The method of claim 8 including arranging the dispenser to be portable between a loading site and a dispensing site.

12. The method of claim 11 including arranging the microcircuitry to transport loading information with the dispenser between the loading and dispensing sites.

13. A combination including a reloadable dispenser and comprising:

a. a reload controller programmed to direct loading of the dispenser with dispensable objects;

b. the dispenser having microcircuitry retaining information on objects loaded in the dispenser;

c. the dispenser having retainers operably connected with the microcircuitry for retaining objects loaded in the dispenser until the retainers are selectively released for dispensing;

d. the reload controller communicating with the microcircuitry in the dispenser;

e. the reload controller being arranged to actuate the microcircuitry to access the object loading information and to release the retainers;

f. the reload controller being programmed with information on a predetermined loading of varieties of the objects to be dispensed;

g. the reload controller having an interface accessible to a person reloading the container;

h. the reload controller being arranged to respond to a request for loading one of the varieties of the objects by releasing selected ones of the retainers to afford access to and to give the person a visual indication of locations available for loading the variety of objects; and i. the reload controller being arranged to receive confirmation from the person that the variety of objects has been loaded into the dispenser.

14. The combination of claim 13 wherein the reload controller is arranged to display to the person information on objects loaded into the dispenser.

15. The combination of claim 13 wherein the reload controller is arranged to select retainers for release in a manner that distributes different weights of objects throughout the dispenser.

16. The combination of claim 13 wherein the dispenser is a portable case, and the microcircuitry in the dispenser carries object loading information as the case moves from a reloading site to a dispensing site.

17. A method of operating the combination of claim 13, the method comprising:

a. latching all released retainers;

b. inputting to the reload controller a request to load a selected one of the variety of objects;

c. loading the selected variety of objects into the locations having released retainers;

d. latching the released retainers to retain the loaded objects; and e. confirming to the reload controller the loading of the selected variety of the objects.

18. A dispenser reloading system comprising:

a. the dispenser having an array of locations for each of the objects to be dispensed and a corresponding array of retainers having latched positions blocking object entry to or exit from each location and having unlatched positions allowing object entry to and exit from each location;

b. the dispenser having microcircuitry arranged to unlatch selected ones of the retainers to enable loading of the objects into the locations and to allow dispensing of the objects from the locations; and c. a reload controller communicating with the microcircuitry and being programmed to unlatch retainers for locations into which objects are to be loaded.

19. The system of claim 18 wherein the reload controller is programmed to communicate object loading information to and from the microcircuitry.

20. The system of claim 19 wherein the dispenser is portable and carries the loading information between a loading and a dispensing site.

21. A method of reducing errors that can be made in loading a variety of objects into a dispenser for dispensing, the method comprising:

a. arranging an object retainer at each object location of a dispensing array;

b. making the object retainers latchable and unlatchable to block entry or exit of objects at locations where retainers are latched and allow entry or exit of objects at locations where retainers are unlatched;

c. making latched and unlatched conditions of the retainers readily visually discernable to a person reloading the dispenser;

d. arranging microcircuitry in the dispenser to selectively unlatch the retainers; and e. using a reload controller communicating with the microcircuitry to unlatch retainers where predetermined varieties of the objects should be loaded to guide a person loading the dispenser into loading each variety of objects in locations designated by the reload controller.

22. The method of claim 21 including manually relatching any unlatched retainers before reloading and manually relatching unlatched retainers at locations that receive loaded objects.

23. The method of claim 21 including arranging the microcircuitry to store information on the loading of the objects into the locations.

* * * * *